(12) United States Patent
Garmendia Olarreaga et al.

(10) Patent No.: US 11,303,241 B2
(45) Date of Patent: Apr. 12, 2022

(54) ROTATING ELECTRICAL MACHINE

(71) Applicant: INDAR ELECTRIC S.L., Beasain (ES)

(72) Inventors: Iker Garmendia Olarreaga, Andarroa (ES); Alexander Galarraga Telleria, Azpeitia (ES); Nestor Campo Caballero, Donostia (ES); Julio Sevilla Irujo, Hendaye (ES); Aitor Aramburu Pino, Zumarraga (ES)

(73) Assignee: INDAR ELECTRIC S.L., Beasain (ES)

( * ) Notice: Subject to any disclaimer, the term of this patent is extended or adjusted under 35 U.S.C. 154(b) by 0 days.

(21) Appl. No.: 17/052,446

(22) PCT Filed: May 7, 2019

(86) PCT No.: PCT/EP2019/061743
§ 371 (c)(1),
(2) Date: Nov. 2, 2020

(87) PCT Pub. No.: WO2019/215195
PCT Pub. Date: Nov. 14, 2019

(65) Prior Publication Data
US 2021/0175830 A1    Jun. 10, 2021

(30) Foreign Application Priority Data

May 9, 2018   (EP) ..................... 18382317

(51) Int. Cl.
*H02P 25/03*   (2016.01)
(52) U.S. Cl.
CPC ..................... *H02P 25/03* (2016.02)
(58) Field of Classification Search
CPC ..................................................... H02P 25/03
See application file for complete search history.

(56) References Cited

U.S. PATENT DOCUMENTS

| | | | |
|---|---|---|---|
| 4,659,973 A | 4/1987 | Stich | |
| 6,693,778 B1 * | 2/2004 | Pittman | G01R 31/343 |
| | | | 361/20 |

(Continued)

FOREIGN PATENT DOCUMENTS

| | | |
|---|---|---|
| CA | 1 124 781 A | 6/1982 |
| EP | 2 779 379 A2 | 9/2014 |
| WO | 2013/079761 A1 | 6/2013 |

OTHER PUBLICATIONS

International Search Report for PCT/EP2019/061743 dated Jul. 3, 2019 [PCT/ISA/210].

(Continued)

*Primary Examiner* — Thai T Dinh
(74) *Attorney, Agent, or Firm* — Sughrue Mion, PLLC

(57) ABSTRACT

Rotating electric machine comprising a main electric machine, an excitation machine whose rotor is adapted to rotate with a rotor of the main electric machine and produce magnetizing power to the main electric machine, and a controllable rectifier bridge electrically connected to the excitation machine for feeding a field magnetization current to a rotor winding of the main electric machine and comprising controllable semiconductor components for controlling the field magnetization current. The rotating electric machine comprises a controllable circuit connected in parallel with the rotor winding and adapted to lower the magnetization of said rotor winding. The controllable circuit is a self-controlled circuit configured to self-act depending on the voltage across said rotor winding and comprises a discharge resistor dissipating the field magnetization current to lower the magnetization of said rotor winding.

12 Claims, 3 Drawing Sheets

(56) References Cited

U.S. PATENT DOCUMENTS

| | | | | |
|---|---|---|---|---|
| 7,633,259 | B2* | 12/2009 | Fish | H02P 9/102 |
| | | | | 318/701 |
| 7,944,183 | B2* | 5/2011 | Nishimura | H02P 29/0241 |
| | | | | 322/28 |
| 8,450,892 | B2* | 5/2013 | Patel | H02K 11/042 |
| | | | | 310/68 D |
| 8,536,816 | B2* | 9/2013 | Fish | H02K 11/20 |
| | | | | 318/490 |
| 10,027,267 | B2* | 7/2018 | Vandergrift | H02P 9/48 |
| 2008/0024941 | A1 | 1/2008 | Fish | |
| 2009/0296777 | A1* | 12/2009 | Fish | H02P 29/68 |
| | | | | 374/152 |

OTHER PUBLICATIONS

Written Opinion for PCT/EP2019/061743 dated Jul. 3, 2019 [PCT/ISA/237].
European Search Report for EP 18 38 2317 dated Sep. 11, 2018.

* cited by examiner

ROTATING ELECTRICAL MACHINE

CROSS REFERENCE TO RELATED APPLICATIONS

This application is a National Stage of International Application No. PCT/EP2019/061743 filed May 7, 2019, claiming priority based on European Patent Application No. 18382317.8 filed May 9, 2018.

FIELD OF THE INVENTION

The present invention relates to rotating electric machines.

BACKGROUND OF THE INVENTION

The operation of rotating electrical machines, such as motors and generators, is based on magnetic interaction between a stator and a rotor of the machine. Some type of said machines are with brushless excitation, an comprise a main electric machine, an excitation machine whose rotor is adapted to rotate with a rotor of the main electric machine and produce magnetizing power to the main electric machine, and a controllable rectifier bridge electrically connected to the excitation machine for feeding a field magnetization current to a rotor winding of the main electric machine, as the rotating electrical machine disclosed in WO2013/079761A1.

WO2013/079761A1 discloses a rotating electric machine with brushless excitation, comprising a main electric machine, an excitation machine whose rotor is adapted to rotate with a rotor of the main electric machine and produce magnetizing power to the main electric machine, a rectifier bridge electrically connected to the excitation machine for feeding a field magnetization current to a rotor winding of the main electric machine, the rectifier bridge being a controlled rectifier bridge comprising controllable semiconductor components for controlling the field magnetization current. The rotating electric machine further comprises a rotor control unit connected to the rectifier bridge and adapted to control controllable semiconductor components, and a controllable circuit for lowering the magnetization of the rotor winding. When the magnetization of a magnetizing winding is to be lowered quickly, the rotor control unit act upon the controllable circuit.

DISCLOSURE OF THE INVENTION

The object of the invention is to provide a rotating electric machine with brushless excitation, as defined in the claims.

The rotating electric machine with brushless excitation comprises a main electric machine, an excitation machine whose rotor is adapted to rotate with a rotor of the main electric machine and produce magnetizing power to the main electric machine, and a rectifier bridge electrically connected to the excitation machine for feeding a field magnetization current to a rotor winding of the main electric machine. The rectifier bridge is a controlled rectifier bridge comprising controllable semiconductor components for controlling the field magnetization current.

The rotating electric machine further comprises a rotor control unit connected to the rectifier bridge and adapted to control controllable semiconductor components, and a controllable circuit connected in parallel with the rotor winding of the main electric machine and adapted to lower the magnetization of said rotor winding.

The controllable circuit is a self-controlled circuit configured to self-act depending on the voltage across said rotor winding, said self-controlled circuit comprising a discharge resistor which dissipates the field magnetization current to lower the magnetization of said rotor.

Therefore, a safety solution is proposed, which does not need any communication or similar to operate. This implies a safer and simpler solution compared to ones of the prior art.

Furthermore, independent of the operating or stopped state of the rotating electric machine, including the states that control module is inoperative, the self-controlled circuit protects the rotor winding of the rotating electric machine and the controllable semiconductor components from surges arising from lightning or incorrect switchgear maneuvers.

These and other advantages and features of the invention will become evident in view of the drawings and the detailed description of the invention.

DETAILED DESCRIPTION OF THE INVENTION

Figure 1:
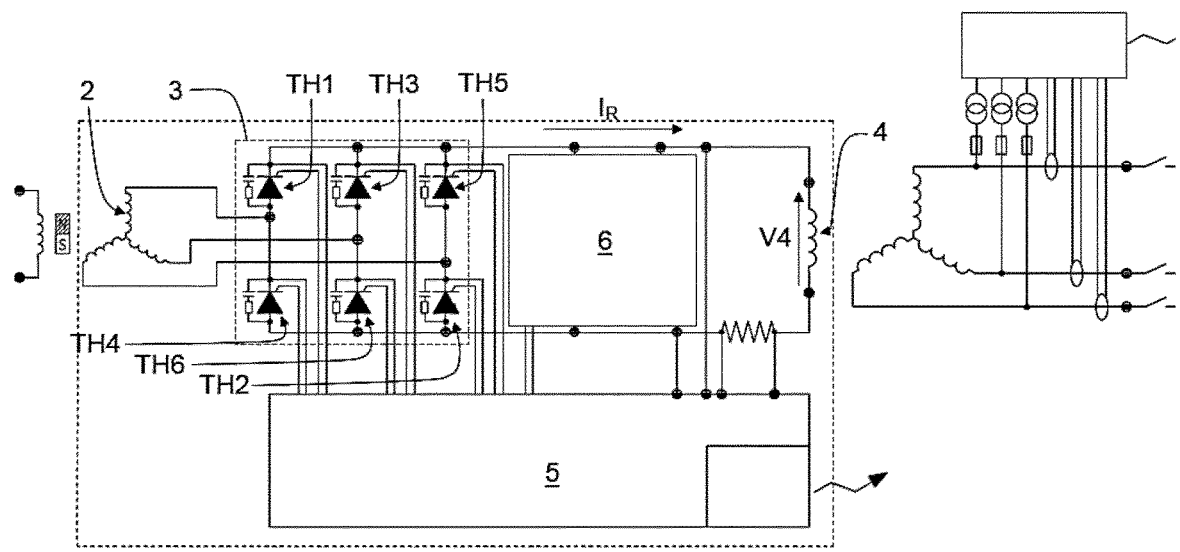
FIG. 1 schematically shows a main circuit structure of an embodiment of the rotating electric machine with brushless excitation of the invention.

FIG. 1 schematically shows a main circuit structure of an embodiment of a rotating electric machine with brushless excitation of the invention.

The rotating electric machine comprises a main electric machine and an excitation machine whose rotor is adapted to rotate with a rotor of the main electric machine and produce magnetizing power to the main electric machine. Therefore, the magnetization of the rotating electric machine is produced by a rotor winding 2 of an excitation machine which is rotating together with the rotor of the main electrical machine.

The rotating electric machine also comprises a rectifier bridge 3 electrically connected to the excitation machine for feeding a field magnetization current $I_R$ to a rotor winding 4 of the main electric machine. The rectifier bridge 3 is a controlled rectifier bridge comprising controllable semiconductor components TH1 to TH6 for controlling the field magnetization current $I_R$. The current from the rotor winding 2 of the excitation machine is rectified by means of the rectifier bridge 3, resulting in a DC current (a field magnetization current $I_R$), that is fed to the rotor of the main electrical machine (to the rotor winding 4).

The rotating electric machine further comprises a rotor control unit 5 connected to the rectifier bridge 3 and adapted to control controllable semiconductor components TH1 to TH6, and a controllable circuit connected in parallel with the rotor winding 4 of the main electric machine and adapted to lower the magnetization of said rotor winding 4. The control unit 5 is arranged in the rotating part of the electrical machine.

In this type of rotating electric machines, it is well known the use of automatic voltage regulators AVR. The rotating electric machine of the invention also comprises at least one automatic voltage regulator AVR, that is communicated with the control unit 5 bidirectionally and wirelessly. This is advantageous since the control unit 5 is arranged in the rotor of the main electric machine (in a rotary part of the machine, then). Additionally, this means that both are adapted to send and receive information. The control unit 5 can, for example, send to the automatic voltage regulator AVR a measured value of the field magnetization current $I_R$, which allows the use of said measurements in the control strategies carried out by the automatic voltage regulator AVR.

The controllable circuit is a self-controlled circuit 6 configured to self-act depending on the voltage V4 across said rotor winding 4. Said self-controlled circuit 6 comprises a discharge resistor 6R1, which dissipates at least part of the field magnetization current $I_R$ to lower the magnetization of said rotor winding 4 when required (depending on the voltage V4 across the rotor winding 4, in particular when voltage V4 is greater than a setting level, which is higher than normal operating range).

Figure 2:
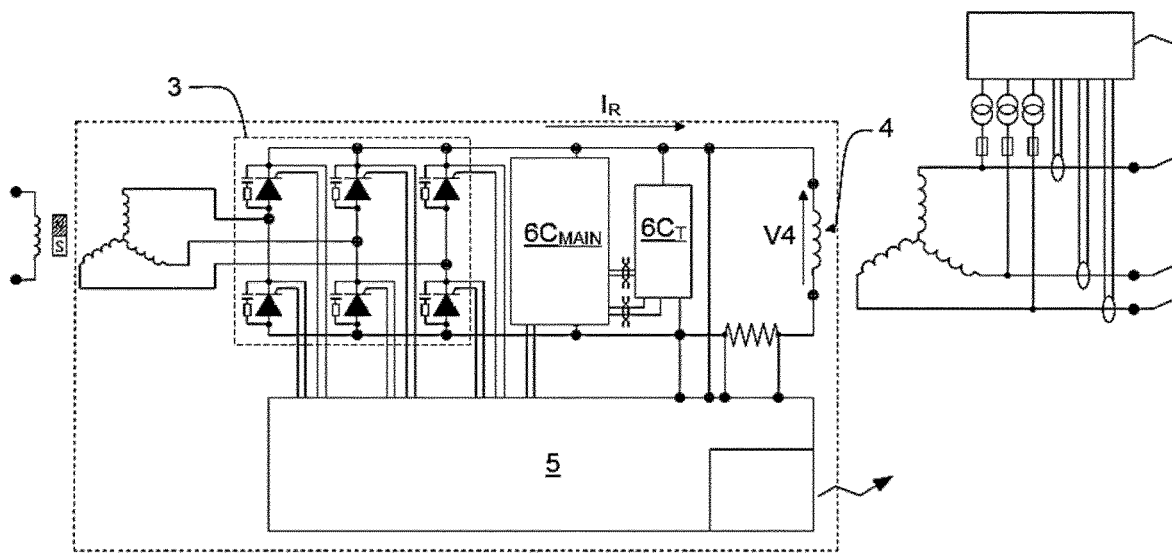
FIG. 2 schematically shows the main circuit structure of FIG. 1, where the main and triggering circuits of the self-controlled circuit are represented.

As shown in FIG. 2, the self-controlled circuit 6 comprises a main circuit $6C_{MAIN}$ comprising the discharge resistor 6R1 and connected in parallel with the rotor winding 4, and a triggering circuit $6C_T$ connected in parallel with the rotor winding 4 and with the main circuit $6C_{MAIN}$. The triggering circuit $6C_T$ is configured to force at least part of the field magnetization current $I_R$ to flow through the discharge resistor 6R1 of the main circuit $6C_{MAIN}$ in a magnetization direction to lower the magnetization of the rotor winding 4 (depending on the voltage V4 across the rotor winding 4).

Figure 3:
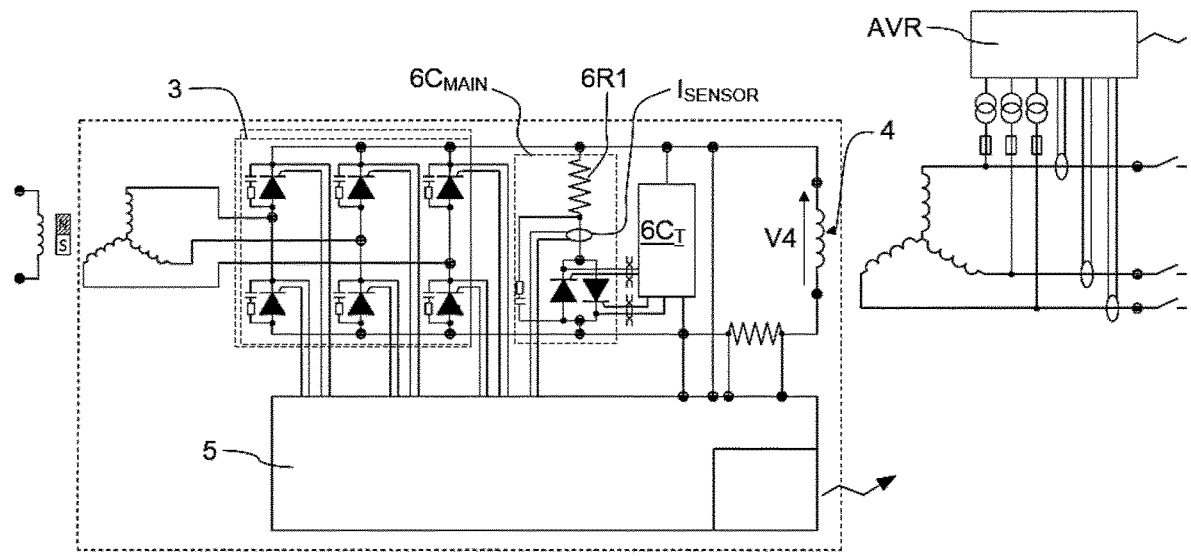
FIG. 3 schematically shows the main circuit structure of FIG. 1, where the elements forming the main circuit of the self-controlled circuit are also represented.
Figure 4:
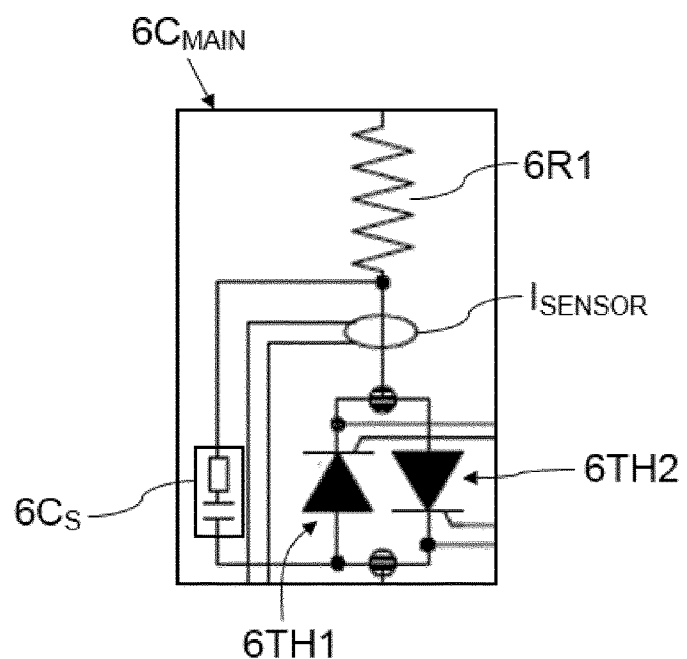
FIG. 4 shows in detail the main circuit of the self-controlled circuit of the main circuit structure of FIG. 1.

The main circuit $6C_{MAIN}$ comprises at least one controllable component 6TH1 in series connection with the discharge resistor 6R1, the triggering circuit $6C_T$ being connected to said controllable component 6TH1 to block it or not, depending on the voltage V4 across the rotor winding 4. In particular, the triggering circuit $6C_T$ allows the current flow through the controllable component 6TH1 only when said voltage V4 reaches a specific negative limit value, and in that situation, therefore, at least part of the field magnetization current $I_R$ flows through the main circuit $6C_{MAIN}$ (through the discharge resistor 6R1 and the controllable component 6TH1), it being dissipated by the discharge resistor 6R1. The controllable component 6TH1 comprises a control gate to be blocked or not and two main power terminals, and allows the current flow from a first main power terminal to a second main power terminal once the control gate is activated, the triggering circuit $6C_T$ being connected to said control gate. In a preferred embodiment, as shown in FIGS. 3 and 4, for example, said controllable component 6TH1 is a thyristor.

Figure 5:
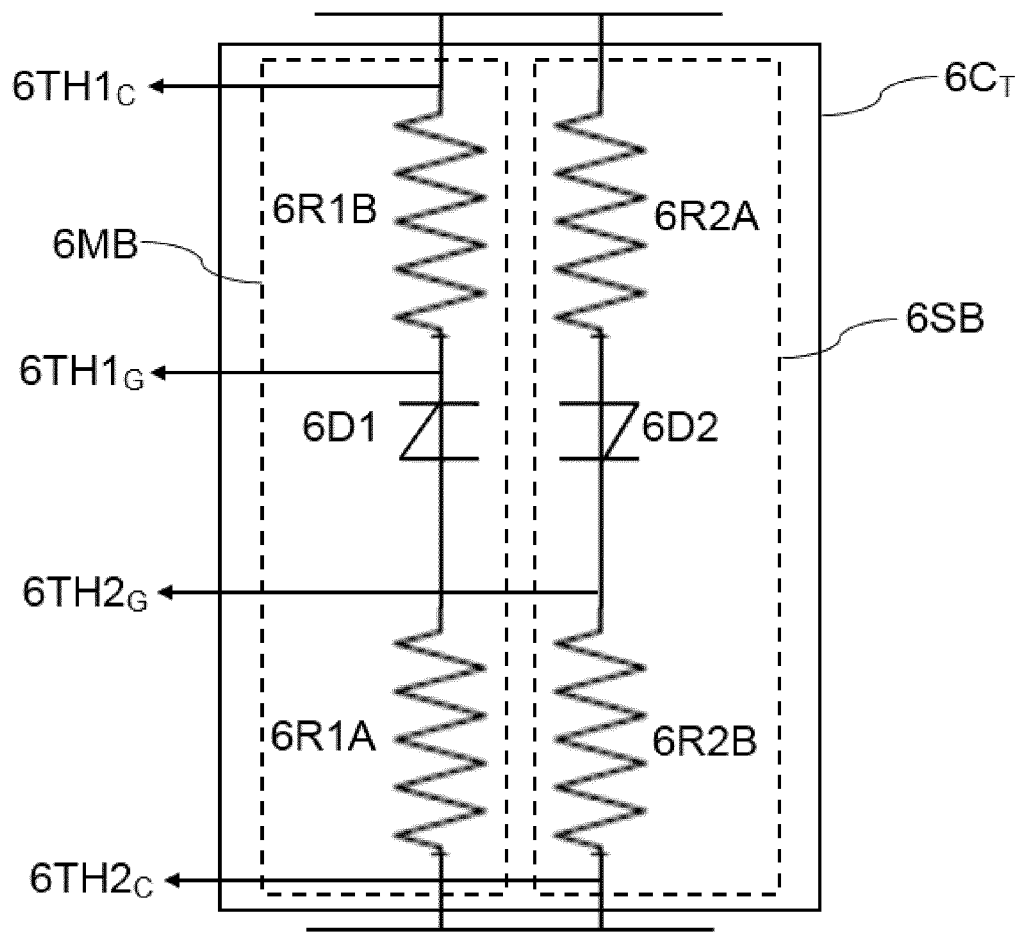
FIG. 5 shows in detail the triggering circuit of the self-controlled circuit of the main circuit structure of FIG. 1.

In the preferred embodiment, as shown in FIG. 5, the triggering circuit $6C_T$ comprises a magnetization electrical branch 6MB connected in parallel with the rotor winding 4, the magnetization electrical branch 6MB comprising preferably two triggering resistors 6R1B and 6R1A in series connection with a breakover or transient voltage suppressor diode 6D1. The breakover or transient voltage suppressor diode 6D1 comprises a specific reverse blocking voltage, the aforementioned specific negative limit value, and is arranged in series between both triggering resistors 6R1B and 6R1A. The gate of the thyristor (controllable component 6TH1) is connected to the joint point between the breakover or transient voltage suppressor diode 6D1 and triggering resistor 6R1B (referred to as $6TH1_G$ in FIG. 5), it being connected to an end of said triggering resistor 6R1B), while the cathode (second main power terminal of the controllable component 6TH1) of said thyristor is connected to the other end of said triggering resistor 6R1B (referred to as $6TH1_C$ in FIG. 5).

In the preferred embodiment, the main circuit $6C_{MAIN}$ comprises a protection sub-circuit $6C_S$ connected in parallel with the controllable component 6TH1, said protection sub-circuit $6C_S$ preferably comprising a resistor in series connection with a capacitor.

In the preferred embodiment, the triggering circuit $6C_T$ is also configured to force at least part of the field magnetization current $I_R$ to flow through the discharge resistor 6R1 of the main circuit $6C_{MAIN}$ in a slipping direction, opposite to the magnetization direction, to protect the rotor winding 4 in a pole slip phenomenon, depending of the voltage V4 across said rotor winding 4. In other embodiments, the triggering circuit $6C_T$ is configured to force at least part of the field magnetization current $I_R$ to flow through the discharge resistor 6R1 of the main circuit $6C_{MAIN}$ only in the magnetization direction or in the slipping direction.

For forcing at least part of the field magnetization current $I_R$ to flow through the discharge resistor 6R1 of the main circuit $6C_{MAIN}$ in the slipping direction, the main circuit $6C_{MAIN}$ comprises at least one controllable component 6TH2 as shown in FIGS. 3 y 4. The triggering circuit $6C_T$ is connected to said controllable component 6TH2 to act upon it, depending of the voltage V4 across said rotor winding 4. In particular, the triggering circuit $6C_T$ allows the current flow through the controllable component 6TH2 only when said voltage V4 reaches a specific positive limit value, and in that situation, therefore, at least part of the field magnetization current $I_R$ flows through the main circuit $6C_{MAIN}$ (through the discharge resistor 6R1 and the controllable component 6TH2), it being dissipated by the discharge resistor 6R1. Said limit value is positive, and therefore, the current flows through the main circuit $6C_{MAIN}$ in a slipping direction opposite to the magnetization direction.

During a pole slip, the field current $I_R$ reverses and flows in the opposite direction, the main electrical machine rotor winding becoming a current source and developing overvoltages, that if not attenuated can damage the bridge rectifier 3, main electrical machine rotor winding 4 and the rotor winding of the excitation machine 2.

The controllable component 6TH1 comprises a control gate to be blocked or not and two main power terminals, and allows the current flow from a first main power terminal to a second main power terminal once the control gate is activated, the triggering circuit $6C_T$ being connected to said gate. Preferably, as in the preferred embodiment shown in Figures, said controllable component 6TH2 is a thyristor.

The triggering circuit $6C_T$ comprises a slipping electrical branch 6SB connected in parallel with the rotor winding 4, as shown in FIG. 5, and with the magnetization electrical branch 6MB (if any). The slipping electrical branch 6SB comprises preferably two triggering resistors 6R2B and 6R2A in series connection with a breakover or transient voltage suppressor diode 6D2. Said breakover or transient voltage suppressor diode 6D2 comprises a specific reverse blocking voltage, the aforementioned specific positive limit value, and is arranged in series between both triggering resistors 6R2B and 6R2A. The gate of the thyristor (controllable component 6TH2) is connected to the joint point between the breakover or transient voltage suppressor diode 6D2 and triggering resistor 6R2B (referred to as $6TH2_G$ in FIG. 5), it being then connected to an end of said triggering resistor 6R2B, while the cathode (second main power terminal of the controllable component 6TH2) of said thyristor is connected to the other end of said triggering resistor 6R2B (referred to as $6TH2_C$ in FIG. 5).

The protection sub-circuit $6C_S$ connected in parallel with the controllable component 6TH1 acts also as a protection sub-circuit for the controllable component 6TH2, not being it necessary to include an additional protection sub-circuit for that purpose.

At least in the preferred embodiment, the rotating electric machine also comprises a current sensor $I_{SENSOR}$ arranged in the main circuit $6C_{MAIN}$, and communicated with the control unit 5, to sense the current flow through said main circuit $6C_{MAIN}$. Therefore, the rotating electric machine can detect when the main circuit $6C_{MAIN}$ dissipates at least part of the magnetization current $I_R$, in spite of said current flow being self-controlled.

The invention claimed is:

1. A rotating electric machine with brushless excitation, comprising:
    a main electric machine;
    an excitation machine whose rotor is adapted to rotate with a rotor of the main electric machine and produce magnetizing power to the main electric machine;
    a controllable rectifier bridge electrically connected to the excitation machine for feeding a field magnetization current to a rotor winding of the main electric machine and comprising controllable semiconductor components for controlling the field magnetization current;
    a rotor control unit connected to the rectifier bridge for controlling the controllable semiconductor components; and
    a controllable circuit connected in parallel with the rotor winding of the main electric machine and configured to lower the magnetization of said rotor winding,
    wherein the controllable circuit is a self-controlled circuit configured to self-act depending on the voltage across said rotor winding, the self-controlled circuit comprising:
    a discharge resistor which dissipates at least part of the field magnetization current to lower the magnetization of said rotor winding, and
    a triggering circuit connected in parallel with the rotor winding and with a main circuit, the triggering circuit being configured to force at least part of the field magnetization current to flow through the discharge resistor of the main circuit in a magnetization direction to lower the magnetization of the rotor winding, the main circuit comprises at least one controllable component being a thyristor, in series connection with the discharge resistor, the triggering circuit being connected to the controllable component to force at lease a part of the field magnetization current to flow through discharge resistor based on the voltage across the rotor winding,
    wherein the controllable component comprises a control gate to be blocked or not and two main power terminals, and configured to allow the current flow from a first main power terminal to a second main power terminal when the control gate is activated, and the triggering circuit being connected to the control gate of the controllable component,
    wherein the triggering circuit comprises a magnetization electrical branch connected in parallel with the rotor winding, the magnetization electrical branch comprises two triggering resistors in series connection with a breakover diode having a predetermined reverse blocking voltage and arranged in series between both of the triggering resistors such that one of the ends of a first triggering resistor being connected to the second main power terminal of the controllable component and the other end of the first triggering resistor being connected to the gate of the controllable component, and
    wherein a current sensor is arranged in the main circuit and communicated with the control unit, to sense the current flow through the main circuit.

2. The rotating electric machine according to claim 1, wherein the main circuit comprises a protection sub-circuit connected in parallel with the controllable component, the protection sub-circuit preferably comprising a resistor in series connection with a capacitor.

3. The rotating electric machine according to claim 2, wherein the current sensor is arranged between the second main power terminal of the controllable component and the connection of the protection sub-circuit to the second main power terminal.

4. The rotating electric machine according to claim 1, wherein the triggering circuit is configured to force at least part of the field magnetization current to flow through the discharge resistor of the main circuit in a slipping direction opposite to the magnetization direction, to protect the rotor winding in a pole slip phenomenon, depending of the voltage across the rotor winding.

5. The rotating electric machine according to claim 4, wherein the main circuit comprises at least one controllable component, the triggering circuit being connected to the controllable component to act upon the controllable component, the controllable component comprising a control gate to be blocked or not and two main power terminals, and allows the current flow from a first main power terminal to a second main power terminal once the control gate is activated, and the triggering circuit being connected to the control gate of the controllable component.

6. The rotating electric machine according to claim 5, wherein the triggering circuit comprises a slipping electrical branch connected in parallel with the rotor winding, the slipping electrical branch comprising at least one triggering resistor in series connection with a breakover or transient voltage suppressor diode comprising a specific reverse blocking voltage, one of the ends of the triggering resistor being connected to the second end of the controllable component and the other end of the triggering resistor being connected with the gate of the controllable component.

7. The rotating electric machine according to claim 6, wherein the triggering circuit is configured to force the field magnetization current to flow through the main circuit, depending of the voltage across the rotor winding, in a magnetization direction to lower the magnetization of the rotor winding or in a slipping direction opposite to the magnetization direction, to protect the rotor winding in a pole slip phenomenon.

8. The rotating electric machine according to claim 7, wherein the main circuit comprises a first controllable component and a second controllable component connected in parallel, the controllable components being connected in series with the discharge resistor, the first controllable component being configured to allow the flow of the field magnetization current in a magnetization direction through the main circuit and the second controllable component being configured to allow the flow of the field magnetization current in a slipping direction opposite the magnetization direction through the main circuit, the triggering circuit being connected to both controllable components.

9. The rotating electric machine according to claim 8, wherein the triggering circuit comprises a magnetization electrical branch connected in parallel with the rotor winding and connected to the first controllable component, and a slipping electrical branch connected in parallel with the rotor winding and with the magnetization electrical branch and connected to the second controllable component.

10. The rotating electric machine according to claim 9, wherein the first controllable component comprises a first thyristor and the second controllable component comprises a second thyristor, both thyristors being connected in anti-parallel and the triggering circuit being connected to the gate of both thyristors.

11. The rotating electric machine according to claim 10, wherein the magnetization electrical branch comprises at least one triggering resistor in series connection with a breakover diode comprising a specific reverse blocking voltage, on the ends of the triggering resistor being connected to the cathode of the first thyristor and the other end of the triggering resistor being connected with the gate of the first thyristor, and the slipping electrical branch comprising at least one triggering resistor in series connection with a breakover diode comprising a specific reverse blocking voltage, one of the ends of the triggering resistor being connected to the cathode of the second thyristor and the other end of the triggering resistor being connected with the gate of the second thyristor.

12. The rotating electric machine according to claim 1, comprising an automatic voltage regulator for controlling the voltage or the current of the rotor winding, the control unit being configured to communicate bi-directionally and wirelessly with the automatic voltage regulator.

* * * * *